United States Patent Office.

FRANZ UCHATIUS, OF VIENNA, AUSTRIA.

IMPROVEMENT IN MAKING STEEL.

Specification forming part of Letters Patent No. 14,976, dated May 27, 1856.

*To all whom it may concern:*

Be it known that I, FRANZ UCHATIUS, of Vienna, in the Empire of Austria, captain in the Austrian service, a subject of the Empire of Austria, have invented an Improvement in the Process of Manufacturing Cast-Steel; and I do hereby declare that the following is a full and exact description of my said invention.

The object of this invention is to reduce the cost of manufacturing cast-steel by economizing the labor of the process. To this end I take pig-iron of the purest quality and melt it in a suitable furnace, and while in a molten state I run the metal into cold water, and thereby reduce it to granulated iron. It is now in a suitable condition to undergo the process which will convert it into cast-steel. This process is founded on the well-known fact that cast-iron enwrapped or surrounded by any oxygenized materials and subjected to a cementing heat for a given time will yield up a portion of its carbon, which will combine with the oxygen driven off from the surrounding materials and form carbonic oxide or carbonic-acid gas. If this process is interrupted before the completion of the process, a partially-decarbonized iron will result, the surface of which will have been converted into a pure iron, while the interior parts remain unchanged; or, in other words, the progress of the decarbonizing action will depend on the amount of metallic surface brought into contact with the oxygen-yielding material with which the iron is surrounded. In order therefore to expedite this operation I reduce the pig-iron, as before mentioned, to a granulated state, and further to economize fuel and labor I avail myself of the heat required for effecting the decarbonization of the iron to reduce the metal, when sufficiently decarbonized, to a molten state, and thus by one and the same heating to convert it into cast-steel, which only needs to be forged to prepare it for the market. The granulated iron I mix with, say, twenty per cent. of roasted pulverized sparry iron ore and four per cent. of fire-clay, (but I do not confine myself to these proportions,) and these substances I place in fire-clay crucibles and subject the same to heat in a cast-steel blast-furnace of any ordinary construction. By thus subjecting the granules of iron in presence of the sparry iron ore to a melting heat the enwrapping oxides will first effect a partial decarbonization of the granulated iron, which decarbonization will be limited in amount according to the size of the granules operated upon, and by reason of the continued application of heat the iron will melt and separate (with the assistance of the melting residues of sparry iron ore) from the impurities with which it was mixed, and also bring down with it a portion of the iron contained in the sparry iron ore, thereby increasing the yield of cast-steel by about six per cent. I would remark that the manipulation of melting and casting are the same as is commonly employed by cast-steel manufacturers.

The quality of the steel is capable of being by this process considerably modified. Thus the finer the pig-iron is granulated the softer will be the steel made therefrom. The softer sorts of welding cast-steel may be obtained by an addition of good wrought-iron in small pieces, and the harder qualities by adding charcoal in various proportions to the before-mentioned mixture.

Having now set forth the nature of my invention and explained the manner of carrying the same into effect, I wish it to be understood that in carrying out my improved process I do not confine myself to the use of the precise materials enumerated, as others doubtless may be found to yield oxygen as required for the carrying out of the decarbonizing process; but

What I claim as my invention, and desire to secure by Letters Patent, is—

The conversion of pig-iron into steel by subjecting the same, when reduced to a granulated state, to the combined action of oxidizing agents and the requisite fluxes, whereby I am enabled to manufacture cast-steel of a determinate quality and obtain it at one melting, as above described.

In witness whereof I, the said FRANZ UCHATIUS, have hereunto set my hand and seal this 18th day of March, in the year of our Lord 1856.

FRANZ UCHATIUS. [L. S.]

In presence of—
Dr. FRANZ LEYDOLS,
FRANZ RIED.